(12) United States Patent
Ahn

(10) Patent No.: US 11,835,118 B2
(45) Date of Patent: Dec. 5, 2023

(54) HARMONIC DRIVE GEAR WITH IMPROVED CONTACT RATIO

(71) Applicant: Foundation of Soongsil University-Industry Cooperation, Seoul (KR)

(72) Inventor: Hyeong Joon Ahn, Gyeonggi-do (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 133 days.

(21) Appl. No.: 17/639,934

(22) PCT Filed: Aug. 24, 2020

(86) PCT No.: PCT/KR2020/011221
§ 371 (c)(1),
(2) Date: Mar. 3, 2022

(87) PCT Pub. No.: WO2021/045419
PCT Pub. Date: Mar. 11, 2021

(65) Prior Publication Data
US 2022/0333674 A1  Oct. 20, 2022

(30) Foreign Application Priority Data
Sep. 3, 2019 (KR) .......................... 10-2019-0108912

(51) Int. Cl.
*F16H 49/00* (2006.01)
*F16H 55/08* (2006.01)

(52) U.S. Cl.
CPC ....... *F16H 55/0833* (2013.01); *F16H 49/001* (2013.01); *F16H 55/08* (2013.01); *F16H 2049/003* (2013.01)

(58) Field of Classification Search
CPC .... F16H 49/001; F16H 55/0833; F16H 55/08; F16H 2049/003
(Continued)

(56) References Cited

U.S. PATENT DOCUMENTS

| 2009/0044651 A1* | 2/2009 | Yamamori | B62D 5/008 74/461 |
| 2010/0319484 A1* | 12/2010 | Kanai | F16H 55/0833 409/10 |

(Continued)

FOREIGN PATENT DOCUMENTS

| JP | 2011-144916 | 7/2011 |
| KR | 10-2014-0041395 | 4/2014 |

(Continued)

*Primary Examiner* — Ha Dinh Ho

(57) ABSTRACT

The present invention relates to a harmonic gear device in which a first similarity curve obtained by similarly transforming a reference curve representing a moving locus of an external tooth with respect to an internal tooth in a non-deflected state and a second similarity curve generated by similarly transforming the first similarity curve are used as a criterion for generating a tooth profile, wherein the present invention may provide the harmonic gear device that enlarges a first curve represented by a moving locus of positive deflection located above the apex of the reference curve among the moving loci of positive deflection of the external teeth on the basis of the reference curve to approximate an approximate reference point arranged on the second similarity curve to create a second curve, and uses the second curve as the top of the tooth profile of the external tooth.

6 Claims, 8 Drawing Sheets

(58) Field of Classification Search
USPC .......................................................... 74/640
See application file for complete search history.

(56) References Cited

U.S. PATENT DOCUMENTS

| | | |
|---|---|---|
| 2012/0285283 A1 | 11/2012 | Ishikawa |
| 2014/0047937 A1* | 2/2014 | Ishikawa ............... F16H 49/001 |
| | | 74/412 R |
| 2019/0003569 A1* | 1/2019 | Ishikawa ................ F16H 55/08 |

FOREIGN PATENT DOCUMENTS

| | | |
|---|---|---|
| KR | 10-2017-0081132 | 7/2017 |
| KR | 10-2018-0011177 | 1/2018 |

* cited by examiner

HARMONIC DRIVE GEAR WITH IMPROVED CONTACT RATIO

RELATED APPLICATIONS

This application is a National Phase of PCT Patent Application No. PCT/KR2020/011221 having International filing date of Aug. 24, 2020, which claims the benefit of priority of Korea Patent Application No. 10-2019-0108912 filed on Sep. 3, 2019. The contents of the above applications are all incorporated by reference as if fully set forth herein in their entirety.

FIELD AND BACKGROUND OF THE INVENTION

The present invention relates to a harmonic drive gear which is three-dimensionally engaged, and more particularly, to a harmonic drive gear which increases a contact ratio between external teeth and internal teeth.

A harmonic drive includes a wave generator, a flex spline, and a circular spline. The wave generator may include an elliptical cam and a bearing disposed around the cam. The flex spline is formed of an elastically deformable material with external teeth disposed on its exterior. The circular spline is disposed outside the flex spline, includes internal teeth, and is formed of a solid material.

The flex spline rotates in connection with the wave generator. Since the flex spline is elastically deformed while rotating, the external teeth of the flex spline and the internal teeth of the circular spline are engaged with each other.

Since the external teeth are elastically deformed, a contact angle, a contact area, and the like of the external teeth and the internal teeth have a great influence on transferring of reduction power. When a contact area of the external teeth and the internal teeth is small and tooth-tops of the external teeth and tooth-roots of the internal teeth do not come into continuous contact with each other, there is a problem that precision and torque decrease. The tooth-tops of the external teeth and tooth-tops of the internal teeth are designed to be continuously engaged, and a tooth height is adjusted according to an axial position for three-dimensional engagement. In this case, an engagement rate decreases at a part where deformation of the flex spline increases.

The present invention is directed to providing a harmonic drive gear which allows tooth-tops of external teeth and tooth-roots of internal teeth to come into continuous contact with each other at a part where deformation of a flex spline increases.

SUMMARY OF THE INVENTION

One aspect of the present invention provides a harmonic drive gear in which a first similarity curve obtained by similarly transforming a reference curve which indicates a moving path of external teeth with respect to internal teeth in a non-deviation state and a second similarity curve obtained by similarly transforming the first similarity curve are used as criteria for generating a tooth profile. Here, a second curve is generated by enlarging a first curve indicated by a positive-deviation moving path located on a peak of the reference curve among positive-deviation moving paths of the external teeth to approximate an arbitrary approximate reference point disposed on the second similarity curve. Also, the second curve is a tooth profile of tooth-tops of the external teeth.

A tooth profile of tooth-roots of the internal teeth may be a third curve generated by enlarging the first curve.

The second curve may be generated by enlarging the first curve by a factor of N, and the third curve may be generated by enlarging the first curve by a factor of (N+1).

The third curve and the first similarity curve may be connected by a straight line which connects a first intersection point of the third curve and a straight line of a preset pressure angle to a second intersection point of the first similarity curve and the straight line of the pressure angle. Here, the straight line may be a linear tooth profile which connects the tooth profile of the tooth-roots of the internal teeth to the tooth profile of the tooth-tops of the internal teeth.

The first similarity curve may be generated through similar transformation $\lambda$ $(0<\lambda<1)$ on the basis of an end point of the reference curve, and the second similarity curve may be generated by rotating the first similarity curve by 180° with an end point of the first similarity curve as a center and similarly transforming the rotated first similarity curve by a factor of $(1-\lambda)/\lambda$.

The second curve may have a peak disposed closer to an original point than a peak of the reference curve on the basis of a Y-axis.

According to an embodiment, there is an effect that tooth-tops of external teeth come into continuous contact with tooth-roots of internal teeth at a part where deformation of a flex spline increases.

DESCRIPTION OF SPECIFIC EMBODIMENTS OF THE INVENTION

Hereinafter, an exemplary embodiment of the present invention will be described in detail with reference to the drawings.

However, the technical concept of the present invention is not limited to the embodiment described below and can be implemented in a variety of different forms. One or more of components of the embodiment may be selectively combined or substituted with one another without departing from the technical concept of the present invention.

Also, unless particularly defined otherwise, the terms (including technical or scientific terms) used herein may have the same meanings generally understood by those of ordinary skill in the art. Generally used terms such as terms defined in dictionaries may be construed in consideration of the contextual meanings of the related art.

Also, terms used herein are intended to explain the embodiment and not to restrict the present invention.

Throughout the specification, the singular forms include the plural forms as well unless the context clearly indicates otherwise. When at least one (or one or more) of A, B, and C is stated, this may include one or more of all combinations of A, B, and C.

Also, in describing components of the embodiment of the present invention, terms such as "first," "second," "A," "B," "(a)," "(b)," and the like may be used.

These terms are merely for distinguishing one element from another, and the essential, order, sequence, and the like of corresponding elements are not limited by the terms.

Also, when it is stated that one element is "connected," "coupled," or "joined" to another, the element may not only be directly connected, coupled, or joined to the other element but may also be connected, coupled, or joined to the other element with another intervening element.

Also, when it is stated that an element is formed or disposed "above (on) or below (beneath)" another element, the two elements may not only come into direct contact with each other, but one or more other elements may also be formed or disposed between the two elements. Also, being "above (on) or below (beneath)" may include not only being in an upward direction but also being in a downward direction on the basis of one element.

Figure 1:
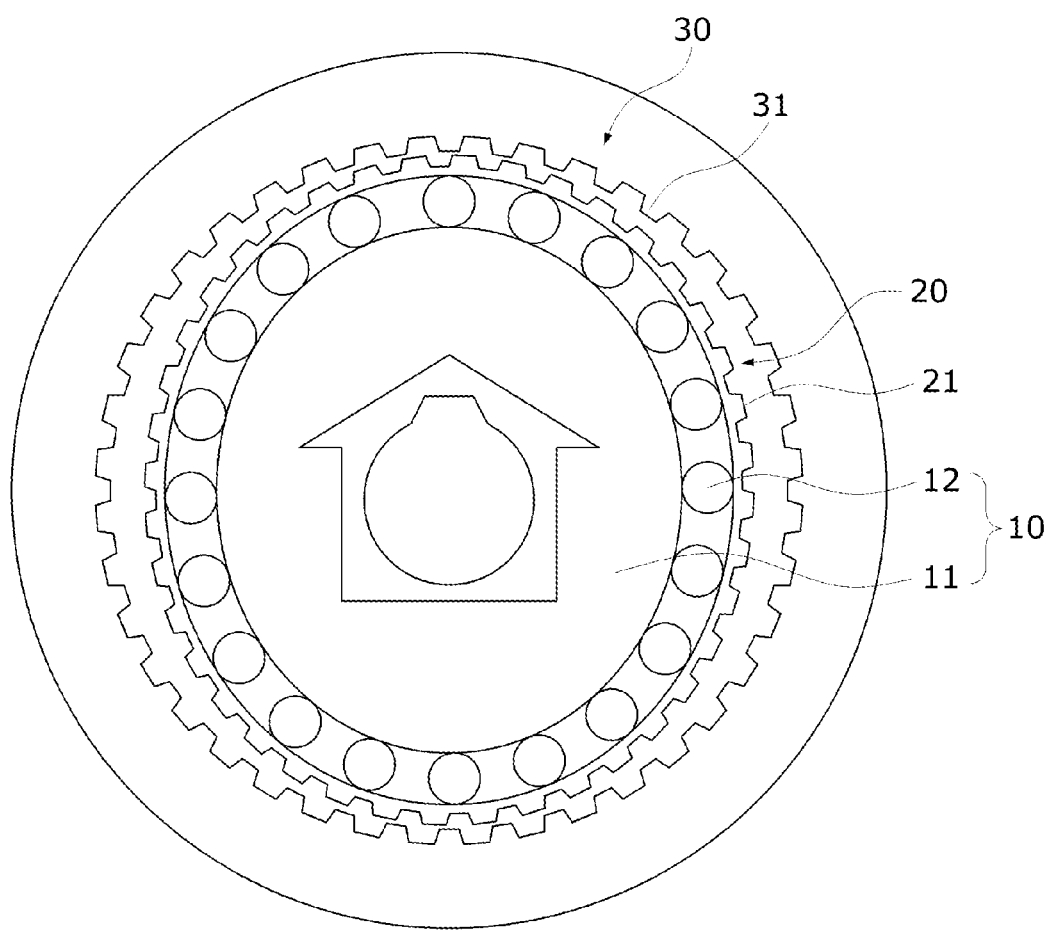
FIG. 1 is a view of a harmonic drive gear according to an embodiment.

FIG. 1 is a view of a harmonic drive gear according to an embodiment.

Referring to FIG. 1, the harmonic drive gear according to the embodiment includes a wave generator 10, a flex spline 20, and a circular spline 30. The flex spline 20 is disposed outside the wave generator 10. The circular spline 30 is disposed outside the flex spline 20.

The wave generator 10 is a member including a cam member 11 and a ball bearing 12 assembled with an outer circumference of the cam member 11 and may have an elliptical shape overall. An inner ring of the ball bearing 12 is fixed to the cam member 11 and an outer ring thereof moves to be elastically deformed to provide wave-formed power.

The flex spline 20 performs a function of determining a reduction ratio and transferring power to an output shaft. The flex spline 20 may include external teeth 21, a body 22, and a diaphragm 23. The body 22 may have a cylindrical shape and be formed of an elastically deformable metal material. The diaphragm 23 may be disposed on one side of the body 22, and the external teeth 21 may be disposed on the other side of the body 22. The diaphragm 23 is connected to the output shaft. The external teeth 21 are disposed on an outer circumference of the body 22. The external teeth 21 may be a spur gear.

The flex spline 20 comes into contact with the wave generator 10 and is elastically deformed into an elliptical shape.

The circular spline 30 is a ring-shaped member and includes internal teeth 31 disposed on an inner circumference. The internal teeth 31 may be a spur gear. The internal teeth 31 and the external teeth 21 are engaged with each other and form a reduction ratio. The number of the internal teeth 31 may be greater than the number of the external teeth 21. For example, the number of the internal teeth 31 may be 2n times (here, n is a positive integer) the number of the external teeth 21. The external teeth 21 may be engaged with the internal teeth 31 on both ends of an elliptical shape in a major-axis direction. The circular spline 30 may be formed of a solid material unlike the flex spline 20.

Figure 2:
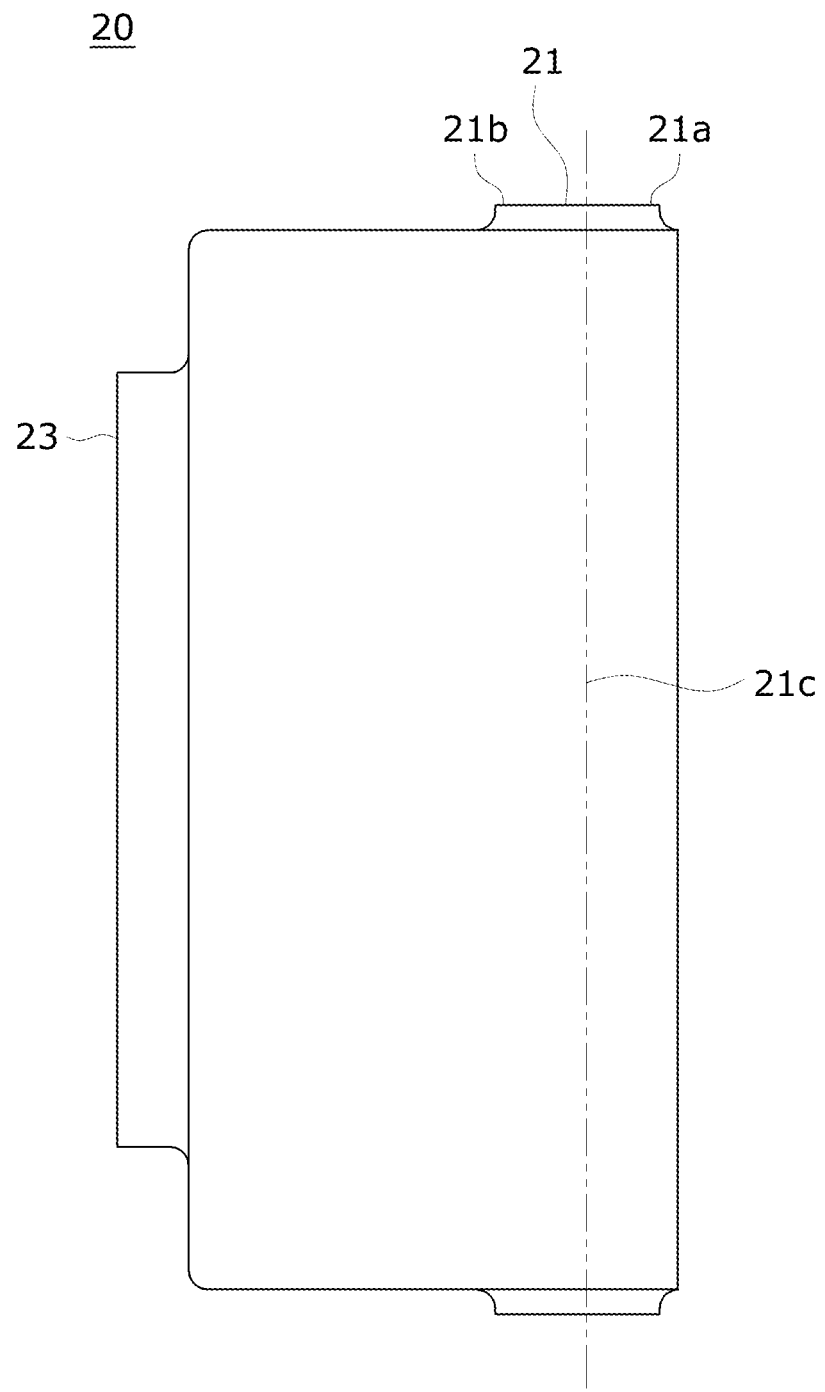
FIG. 2 is a side view of a flex spline.

FIG. 2 is a side view of the flex spline 20.

Referring to FIG. 2, a tooth profile of the external teeth 21 may be defined on the basis of a central surface 21c of the external teeth 21. Here, the central surface 21c may be a surface passing through a center of the ball bearing 12 perpendicular to an axial direction.

Figure 3:
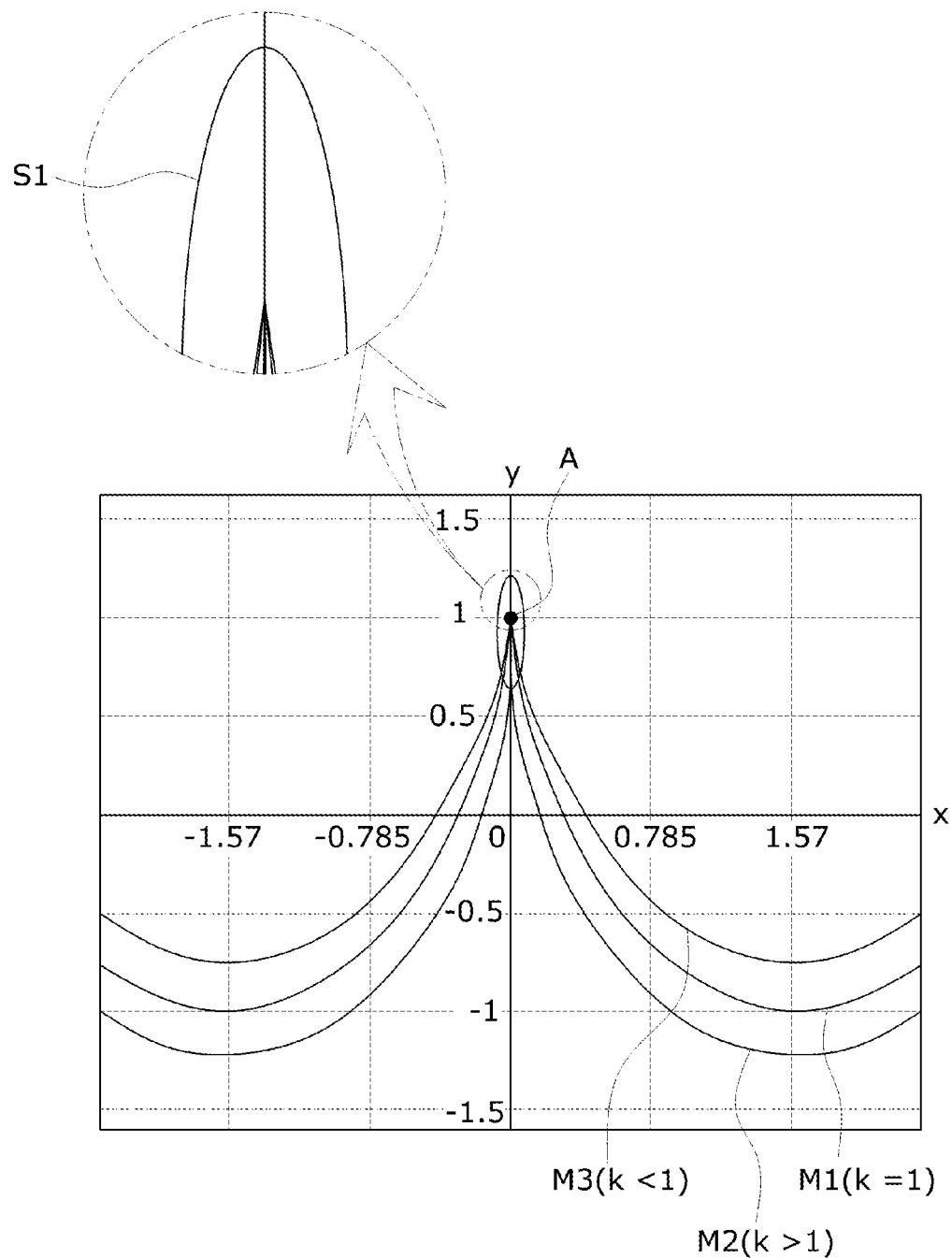
FIG. 3 is a graph illustrating a moving path of external teeth while the external teeth are engaged with internal teeth.

FIG. 3 is a graph illustrating a moving path of the external teeth 21 while the external teeth 21 and the internal teeth 31 are engaged with each other. Hereinafter, in the drawings, when relative movement of the external teeth 21 and the internal teeth 31 approximates a rack, an X-axis is a translational direction of the rack and a Y-axis is a direction orthogonal to the X-axis.

Referring to FIGS. 2 and 3, M1 shown in FIG. 3 indicates a non-deviation moving path M1 of the external teeth 21 in a non-deviation state in which a deviation coefficient k is 1. Here, the non-deviation moving path is obtained from the central surface 21c of the external teeth 21.

When the flex spline 20 is deformed into an elliptical shape by the wave generator 10, a rim-neutral circle of the external teeth 21 of the flex spline 20 is also deformed into an elliptical rim-neutral curve.

Here, when a surface passing through a center of a thickness (rim thickness) of a root part of the external teeth 21 in an original state before elliptically bending due to the wave generator 10 is referred to as a "neutral surface," a rim-neutral circle is a circle formed by lines of intersection of the neutral surface and the central surface 21c of the external teeth 21 and a "rim-neutral curve" is a curve after the rim-neutral circle elliptically bends.

With respect to a position of a major axis of the elliptical rim-neutral curve of the flex spline 20, when a bending rate in a radial direction with respect to the rim-neutral circle before deformation is referred to as w and a value obtained by dividing a radius of the rim-neutral circle by a reduction ratio of a wave gear device is referred to as a standard bending rate w0, the deviation coefficient k indicates a ratio (w/w0) therebetween.

A case in which a standard bending rate is obtained is referred to as non-deviation bending. A case in which a bending rate greater than the standard bending rate (k>1) is obtained is referred to as positive-deviation bending. Also, a case in which a bending rate smaller than the standard bending rate (k<1) is obtained is referred to as negative-deviation bending.

M1 of FIG. 3 is a moving path of the external teeth 21 in the non-deviation state and is obtained from the central surface 21c of the external teeth 21. M2 of FIG. 3 is a positive-deviation moving path M2 of the external teeth 21 in a positive-deviation state and is obtained from an outer end 21a of the external teeth 21 on the basis of the central surface 21c. Also, M3 of FIG. 3 is a negative-deviation moving path M3 of the external teeth 21 in a negative-deviation state and is obtained from an inner end 21b of the external teeth 21 on the basis of the central surface 21c.

Figure 4:
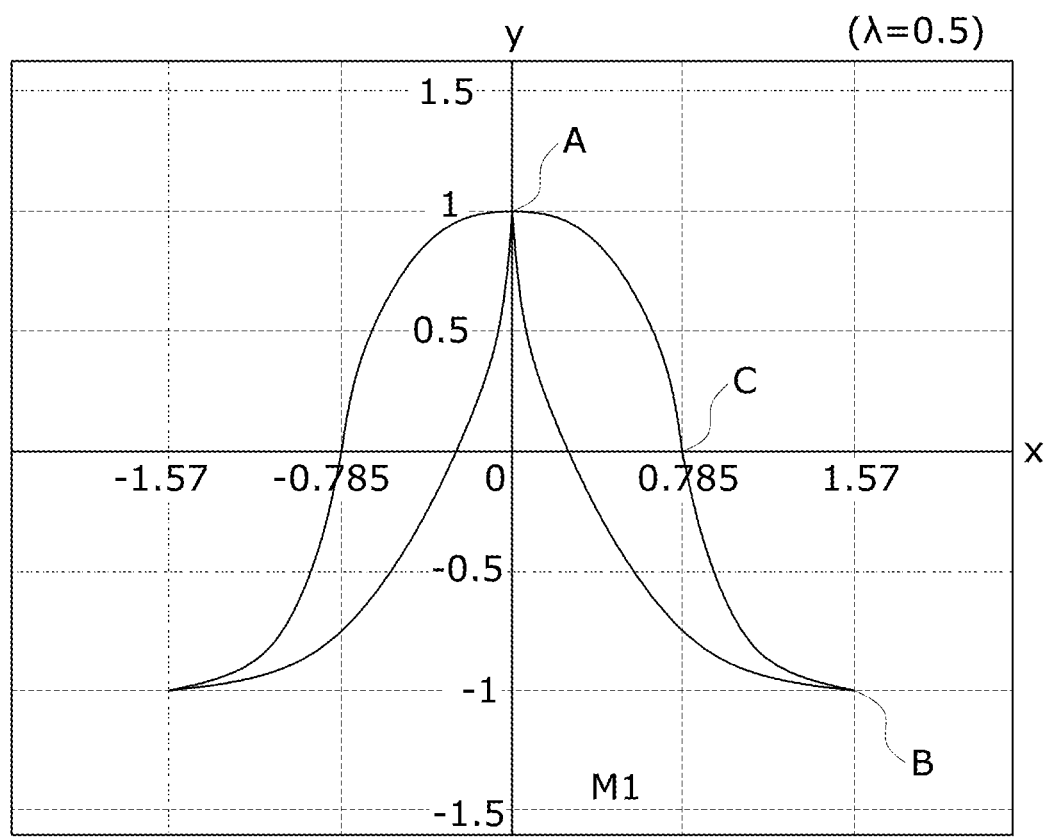
FIG. 4 is a graph illustrating a first similarity curve and a second similarity curve for setting a basic tooth profile of the external teeth.

FIG. 4 is a graph illustrating a first similarity curve BC and a second similarity curve AC for setting a basic tooth profile of the external teeth 21.

Referring to FIG. 4, the first similarity curve BC is set by similarly transforming a reference curve M1 that indicates the moving path of the external teeth 21 in the non-deviation state. For example, with a bottom point of the reference curve M1 as a similarity center, the first similarity curve BC is generated by similarly transforming the reference curve M1 by a factor of $\lambda$ (here, $0<\lambda<1$ and $\lambda=0.5$ in FIG. 4).

The second similarity curve AC is set by similarly transforming the first similarity curve BC. For example, the second similarity curve AC is generated by rotating the first similarity curve BC 180° with an end point C of the first similarity curve BC as a center and similarly transforming the rotated first similarity curve BC by a factor of $(1-\lambda)/\lambda$ with the end point C as the center.

In the harmonic drive gear according to the embodiment, a tooth profile of tooth-tops of the external teeth 21 is generated using a first curve S1 shown in the positive-deviation moving path of the external teeth 21.

The first curve S1 indicates a positive-deviation moving path located on a peak A of the reference curve M1 of the positive-deviation moving path of the external teeth 21.

Figure 5:
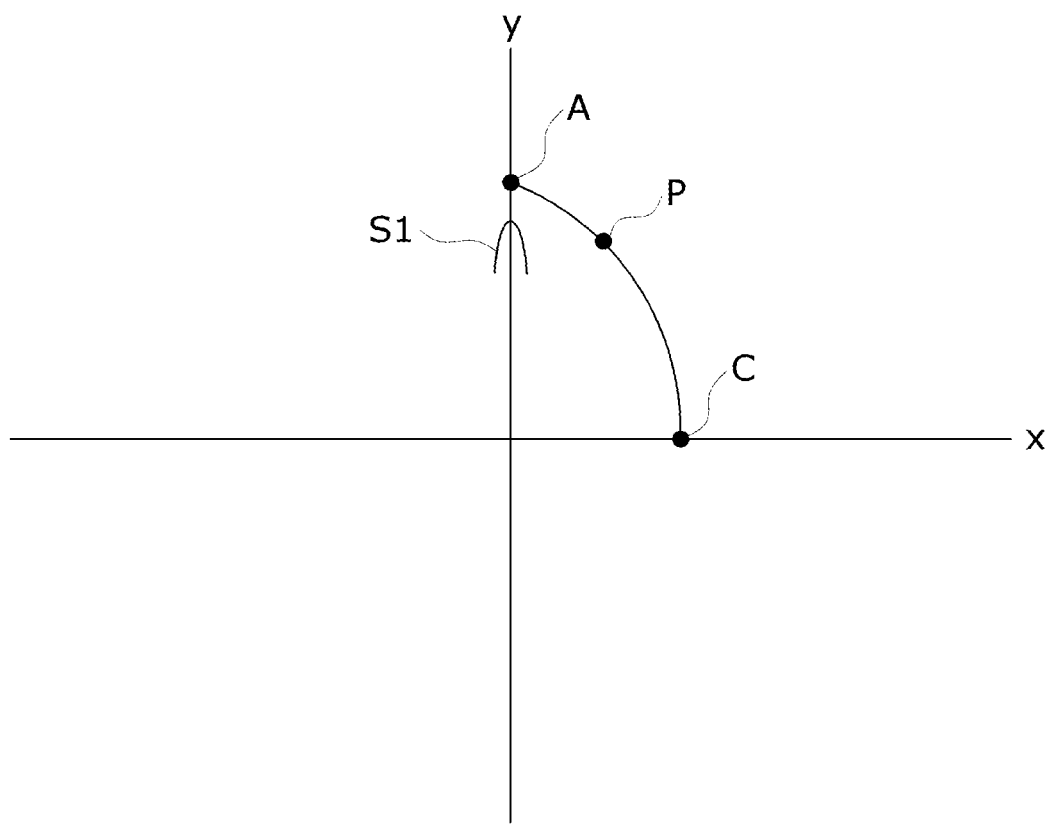
FIG. 5 is a graph in which a first curve before enlargement is disposed.
Figure 6:
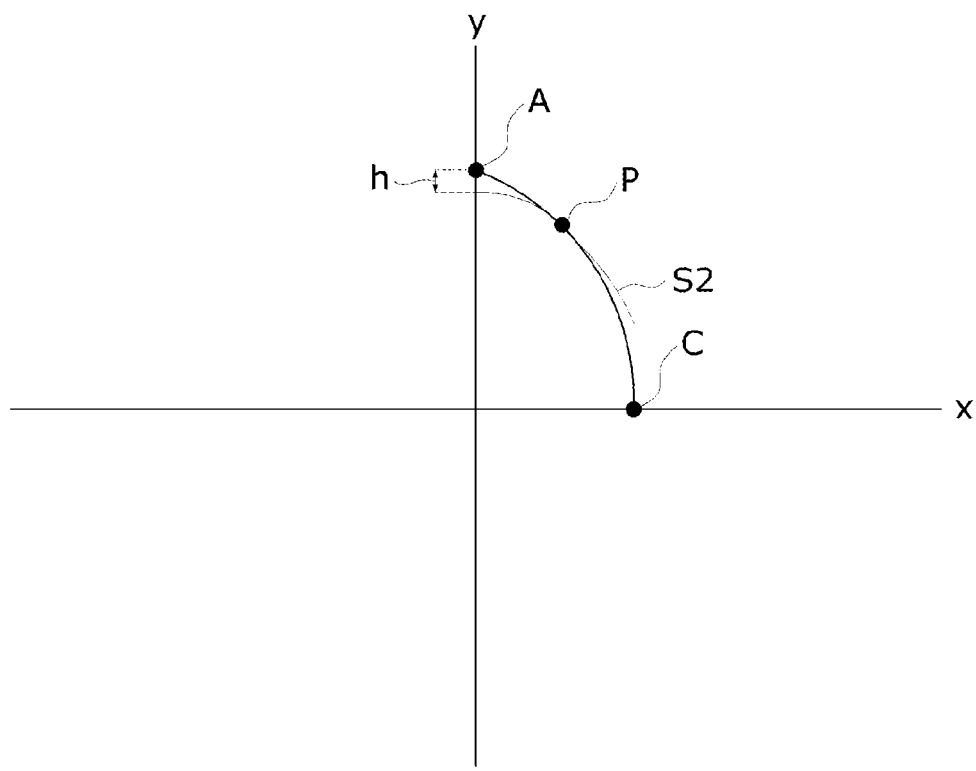
FIG. 6 is a graph illustrating a second curve formed by enlarging the first curve to approximate an approximate reference point of a second rising curve.

FIG. 5 is a graph in which the first curve S1 before enlargement is disposed, and FIG. 6 is a graph illustrating a second curve formed by enlarging the first curve S1 to approximate an approximate reference point of a second rising curve.

The first curve S1 is enlarged to approximate any approximate reference point P disposed on the second similarity curve AC. Here, the first curve S1 is disposed to be symmetrical with respect to the Y-axis. The second curve is generated by enlarging the first curve S1 by a factor of N to approximate the approximate reference point P. The peak of the second curve is moved downward by h on the basis of the Y-axis in comparison to the peak of the reference curve M1. Here, h and N are set to allow a tooth path to approximate the tooth profile of the external teeth most. h and N vary according to the approximate reference point P. The approximate reference point P may be determined to be an intermediate point between arbitrary positions in an axial direction that is positive displacement. The generated second curve is set as the tooth profile of tooth-tops of the external teeth 21.

Figure 7:
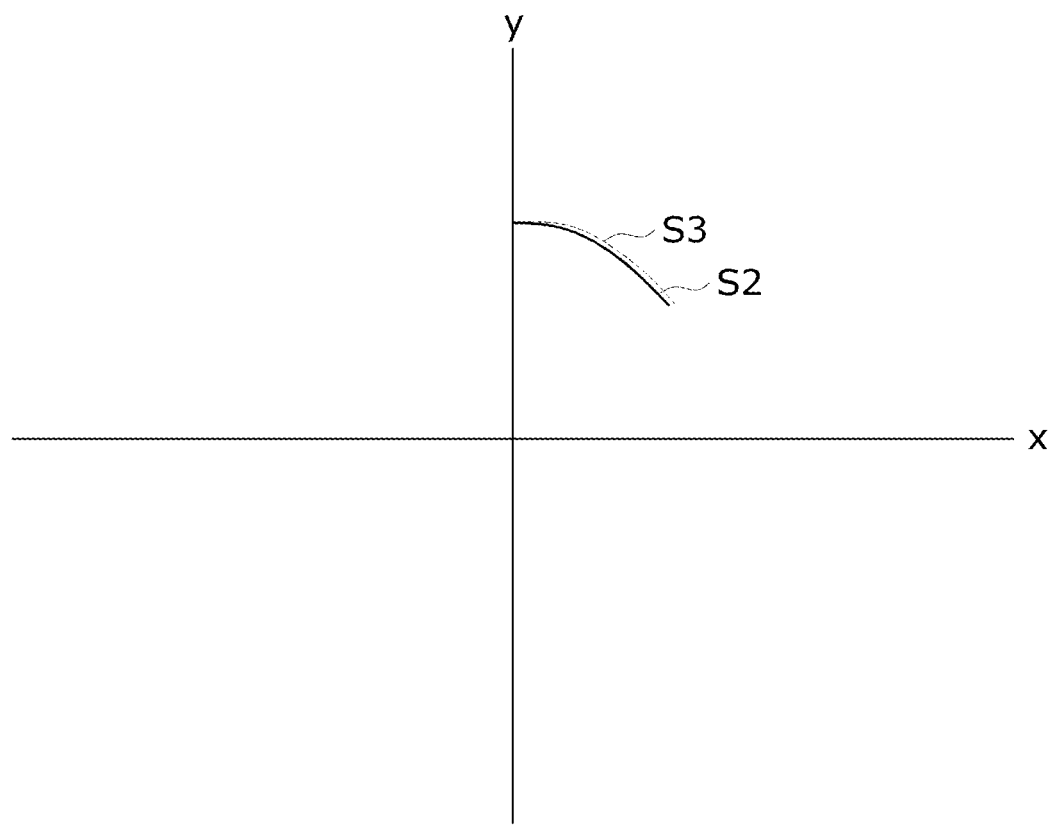
FIG. 7 is a graph illustrating a third curve generated by enlarging the first curve.

FIG. 7 is a graph illustrating a third curve S3 generated by enlarging the first curve S1.

Referring to FIG. 7, the third curve S3 is generated by enlarging the first curve S1 by a factor of N+1. The generated third curve S3 is set as a tooth profile of tooth-roots of the internal teeth 31. When a multiple of the first curve S1 for allowing the second curve S2 corresponding to the tooth profile of the tooth-roots of the external teeth 21 to approximate the approximate reference point P is determined, the third curve S3 corresponding to a tooth profile of tooth-roots of the internal teeth 31 engaged with the tooth-tops of the external teeth 21 is generated by adding one to the determined multiple to enlarge the first curve S1 so that there is an advantage of continuously engaging the external teeth 21 with the internal teeth 31.

Figure 8:
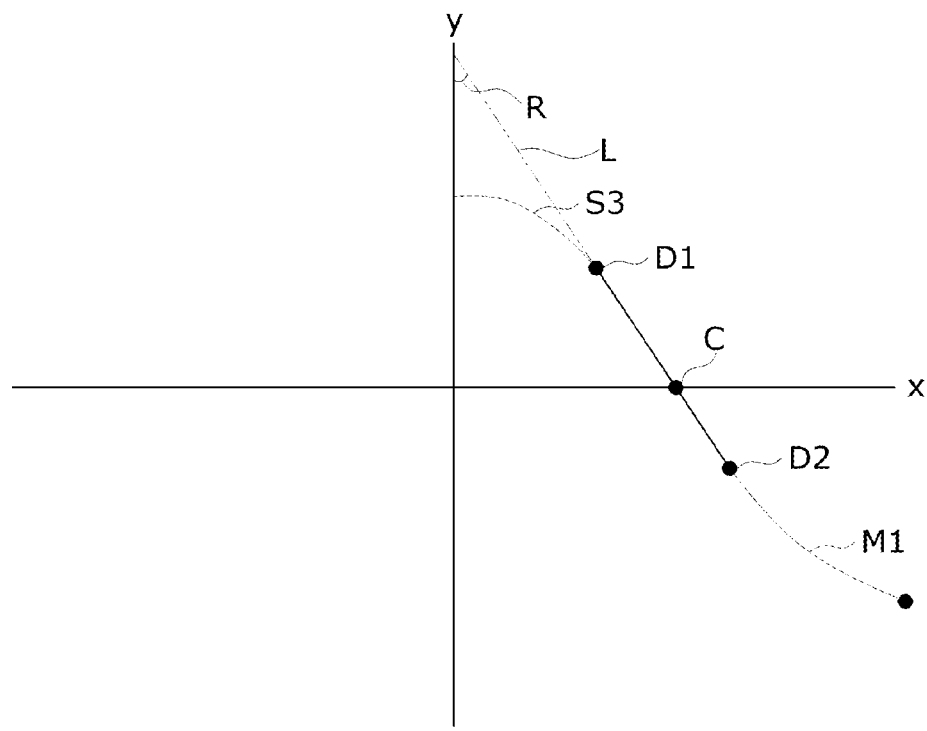
FIG. 8 is a graph illustrating a linear tooth profile formed by connecting the first similarity curve to the third curve.

FIG. 8 is a graph illustrating a linear tooth profile formed by connecting the first similarity curve BC to the third curve S3.

Referring to FIG. 8, a straight line L which connects the first similarity curve BC to the third curve S3 is set as a linear tooth profile which connects tooth-roots to tooth-tops of the internal teeth 31. The straight line L is set on the basis of a line of a preset pressure angle R. For example, the straight line L which connects a first intersection point D1 of the line of the pressure angle R and the third curve S3 to a second intersection point D2 of the line of the pressure angle R and the first similarity curve BC may be the linear tooth profile which connects the tooth-roots to tooth-tops of the internal teeth 31. Since the linear tooth profile has a position which varies in an axial direction, there is an advantage that contact is possible even in a moving path of the external teeth 21 or the internal teeth 31 which have different deviation rates.

The harmonic drive gear according to one exemplary embodiment of the present invention has been described above in detail with reference to the attached drawings.

The above description is merely an exemplary description of the technical concept of the present invention, and a variety of modifications, changes, and substitutes can be made by those of ordinary skill in the art without departing from the essential characteristic of the present invention. Accordingly, the embodiment of the present invention and the attached drawings are not intended to restrict the technical concept of the present invention but are intended to explain the same. Also, it should be noted that the scope of the technical concept of the present invention is not limited to the embodiment and the attached drawings. The protection range of the present invention should be construed according to the following claims, and all technical concepts within the range equivalent thereto should be construed as being included in the scope of the present invention.

The invention claimed is:

1. A harmonic drive gear in which a first similarity curve obtained by similarly transforming a reference curve which indicates a moving path of external teeth with respect to internal teeth in a non-deviation state and a second similarity curve obtained by similarly transforming the first similarity curve are used as criteria for generating a tooth profile,
wherein a second curve is generated by enlarging a first curve indicated by a positive-deviation moving path located on a peak of the reference curve among positive-deviation moving paths of the external teeth to approximate an arbitrary approximate reference point disposed on the second similarity curve, and
wherein the second curve is a tooth profile of tooth-tops of the external teeth.

2. The harmonic drive gear of claim 1, wherein a tooth profile of tooth-roots of the internal teeth is a third curve generated by enlarging the first curve.

3. The harmonic drive gear of claim 2, wherein the second curve is generated by enlarging the first curve by a factor of N, and
wherein the third curve is generated by enlarging the first curve by a factor of (N+1).

4. The harmonic drive gear of claim 3, wherein the third curve and the first similarity curve are connected by a straight line which connects a first intersection point of the third curve and a straight line of a preset pressure angle to a second intersection point of the first similarity curve and the straight line of the pressure angle, and
wherein the straight line is a linear tooth profile which connects the tooth profile of the tooth-roots of the internal teeth to the tooth profile of the tooth-tops of the internal teeth.

5. The harmonic drive gear of claim 1, wherein the first similarity curve is generated through similar transformation $\lambda$ ($0<\lambda<1$) on the basis of an end point of the reference curve, and
wherein the second similarity curve is generated by rotating the first similarity curve by 180° with an end point of the first similarity curve as a center and similarly transforming the rotated first similarity curve by a factor of $(1-\lambda)/\lambda$.

6. The harmonic drive gear of claim 1, wherein the second curve has a peak disposed closer to an original point than a peak of the reference curve on the basis of a Y-axis.

\* \* \* \* \*